3,031,489
HALOPHOSPHORUS COMPOUNDS AND A METHOD FOR MAKING THEM

Gail H. Birum and James L. Dever, Dayton, Ohio, assignors to Monsanto Chemical Company, St. Louis, Mo., a corporation of Delaware
No Drawing. Filed July 22, 1959, Ser. No. 828,679
18 Claims. (Cl. 260—461)

This invention relates to α-halo-β-oxohydrocarbyl phosphorus esters and a method for making them.

It is an object of this invention to provide a method for the synthesis of chemical intermediates. It is a further object of the present invention to provide α-halo-β-oxohydrocarbyl phosphorus compounds. Another object of the present invention is to provide a process for the synthesis of α-halo-β-oxohydrocarbyl phosphorus compounds.

Applicants' copending application S.N. 763,445, filed September 26, 1958, now U.S. Patent No. 2,961,455, discloses that esters of trivalent phosphorus acids react with α-dicarbonyl compounds by an addition reaction to give 1:1 adducts according to the scheme:

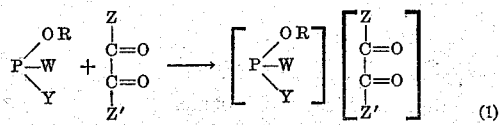

(1)

wherein R is selected from the group consisting of alkyl and haloalkyl radicals which have 1 to 12 carbon atoms, W and Y are selected from the group consisting of hydrocarbyloxy, halohydrocarbyloxy, hydrocarbyl and halohydrocarbyl radicals which are free from aliphatic unsaturation and have from 1 to 12 carbon atoms and wherein W and Y taken together stand for the bivalent —O-alkylene-O— radical having from 2 to 4 carbon atoms in the ring and a total of 2 to 12 carbon atoms, Z is selected from the group consisting of hydrocarbyl radicals which are free of aliphatic unsaturation and have from 1 to 12 carbon atoms, and said radicals having alkoxy groups of from 1 to 2 carbon atoms as substituents therein, and Z' is selected from the group consisting of hydrocarbyl radicals which are free of aliphatic unsaturation and have 1 to 12 carbon atoms, said radicals having alkoxy groups of from 1 to 2 carbon atoms as substituents therein, and hydrogen. The term "hydrocarbyl," as used in this case, is defined in Degering, An Outline of Organic Chemistry, 5th edition (1947), page 135, as follows:

"Hydrocarbyl is the radical obtained by the loss of a hydrogen atom from any hydrocarbon."

There is some reason to believe that the 1:1 adducts have a cyclic structure such as:

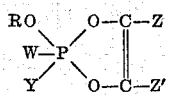

However, the basic chemical and physical information necessary to definitely establish this structure is not yet available. Hence we use the bracketed formula of the reactants to indicate an adduct where necessary.

The trivalent phosphorus esters used in the preparation of the 1:1 adducts and, ultimately, the products of this invention are the esters of phosphorous, phosphonous, and phosphinous acids. Examples of the trivalent phosphorous compounds that can be used are:

Trimethyl phosphite
Triethyl phosphite
Tris(2-chloroethyl) phosphite
Tris(2-chloropropyl) phosphite
Triisopropyl phosphite
Tris(3-chloro-2-bromopropyl) phosphite
Tris(3,4-dichlorobutyl) phosphite
Tri-n-amyl phosphite
Tri-n-hexyl phosphite
Tris(2-ethylhexyl) phosphite
Tridodecyl phosphite
Tris(3-bromopropyl) phosphite
Dimethyl ethyl phosphite
Butyl diethyl phosphite
Amyl di-n-octyl phosphite
Ethyl methyl propyl phosphite
Butyl 2-iodoethyl phenyl phosphite
Dimethyl pentachlorophenyl phosphite
Dibutyl phenyl phosphite
Di-p-tolyl 2-fluoroethyl phosphite
Tricyclohexyl phosphite
Tris(4-methylcyclohexyl) phosphite
Amyl cyclopentyl phenyl phosphite The same substitutents that are indicated above can form the esters of phosphonous and phosphinous acids as well. For example, the trimethyl derivatives of phosphonous and phosphinous acids respectively would be dimethyl methylphosphonite and methyl dimethylphosphinite. Other examples of the phosphonous and phosphinous acid ester counterparts of the phosphorous acid esters are:

Didodecyl dodecylphosphonite
Dimethyl ethylphosphonite
Dibutyl phenylphosphonite
Amyl cyclopentyl phenylphosphonite
Diethyl phenylphosphonite
Bis(2-fluoroethyl) ethylphosphonite Methyl diphenylphosphinite
3-chloropropyl di(3-chloropropyl)phosphinite
Methyl diethylphosphinite Also useful for the preparation of the intermediate adducts are the cyclic esters of phosphorous and phosphonous acids. For example there can be used compounds having the formula:

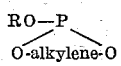

and

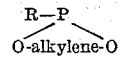

where R and —O-alkylene-O— are as defined above. Examples of such cyclic esters are: 2-ethoxy-1,3,2-dioxaphosphorinane, 2 - chloroethoxy - 1,3,2 - dioxaphospholane, 2-cyclohexyloxy-1,3,2-dioxaphosphepane, and 2-dodecyloxy-5-methyl-1,3,2-dioxaphosphorinane.

The dicarbonylic compounds which are useful for making the intermediate adducts include the α-alkanediones of from 4 to 26 carbon atoms and their alkoxy derivatives. Examples of this group are:

2,3-butanedione
2,3-pentanedione
4-methyl-2,3-pentanedione
3,4-hexanedione
2,2,5,5-tetramethyl-3,4-hexanedione
2,3-hexanedione
5-methyl-2,3-hexanedione
4,5-octanedione
2,3-octanedione
2,7-dimethyl-4,5-octanedione
3,4-heptanedione
5,6-decanedione
3,4-decanedione
5,6-dodecanedione
10,11-eicosanedione
1,2-cyclohexanedione 1,2-cyclopentanedione
13,14-hexacosanedione
4-methyl-2,3-decanedione
2,3-undecanedione
2-methyl-6,7-octanedione
3,4-nonanedione
2,5-dimethyl-3,4-hexanedione
2-methyl-5,6-heptanedione
1-methoxy-2-methyl-3,4-hexanedione
5-ethoxy-2,3-pentanedione
11,12-tetracosanedione Another valuable class of dicarbonylic compounds which react with trivalent phosphorus esters to form adducts useful in the present invention, are the aryl- and cycloalkyl-substituted alpha-alkanediones and the alkoxy derivatives thereof, e.g., 1-phenyl-1,2-pentanedione
3,3-dimethyl-1-phenyl-1,2-butanedione
1-phenyl-1,2-propanedione
1,3,3-triphenyl-1,2-propanedione
1,3-diphenyl-1,2-butanedione
1,4-diphenyl-1,2-butanedione
3-methyl-1-phenyl-1,2-butanedione
1-phenyl-1,2-butanedione
1,4-diphenyl-2,3-butanedione
3,3-dimethyl-(2,4-xylyl)-1,2-butanedione
1-mesityl-3,3-dimethyl-1,2-butanedione
3-cyclohexyl-1-phenyl-1,2-propanedione
1-(m-methoxyphenyl)-3,4-hexanedione
1-(β-naphthyl)-8,9-hexadecanedione
1-(2,4-dimethoxyphenyl)-3-phenyl-1,2-propanedione Also useful as alpha-dicarbonylic compounds are benzil, and the binaphthoyls and their hydrocarbon or ether derivatives, e.g., o-, m-, or p-tolil; o-, m-, or p-anisil; veratril (3,3',4,4' - tetramethoxybenzil); 2,2' - diethoxybenzil; 2,2',4,4',5,5'-hexaethylbenzil; 2'-methoxy-2,4,6-trimethylbenzil; bis[7-methyl-naphthoyl-(1)].

The dicarbonylic compound may also be an alpha-ketoaldehyde, that is, a glyoxal of the formula

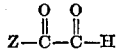

where Z is as defined above. Examples of alpha-ketoaldehydes which have the above formula and which react with the trivalent phosphorus esters to give the 1:1 adducts useful in this invention are:

Pyruvaldehyde
2-oxobutyraldehyde
4-methyl-2-oxobutyraldehyde
Phenylglyoxal
Cyclohexaneglyoxylaldehyde
p-Methoxyphenylglyoxal
Naphthylglyoxal
Cyclopentaneglyoxylaldehyde We have now discovered that α-halo-β-oxohydrocarbyl phosphorus esters may be readily prepared by the reaction of bromine, chlorine or iodine with the 1:1 adduct above defined. This reaction may be illustrated, for example, by the following equation, showing the conversion of the 1:1 adduct of the trivalent phosphorus compound and the α-dicarbonyl compound to an α-halo-β-oxohydrocarbyl phosphorus ester:

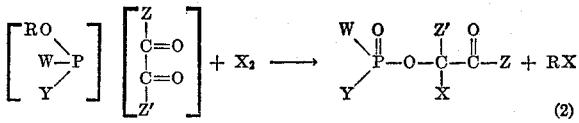

where R, W, Y, Z and Z' are as defined above, and X is chlorine, bromine, or iodine, but is preferably chlorine or bromine.

The new compounds of this invention, namely, those of the formula:

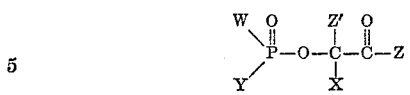

wherein X is a halogen, W and Y are selected from hydrocarbyl, hydrocarbyloxy, halohydrocarbyl, and halohydrocarbyloxy radicals free from aliphatic unsaturation and which have 1 to 12 carbon atoms, and where W and Y taken together stand for the —O-alkylene-O— radical having from 2 to 4 carbon atoms in the ring and a total of from 2 to 12 carbon atoms, Z is selected from the group consisting of hydrocarbyl radicals which are free from aliphatic unsaturation and have from 1 to 12 carbon atoms and Z' is selected from the group consisting of hydrocarbyl radicals which are free from aliphatic unsaturation and have from 1 to 12 carbon atoms and hydrogen, are substituted pentavalent phosphate, phosphonate, or phosphinate esters depending upon the nature of the W and Y constituents, in which active halogen is on the alpha carbon of the β-oxohydrocarbyloxy group and in which the carbon linkages contain no unsaturation.

Examples of products of this invention wherein the Z and Z' radicals are the same so that the ester products are named the same regardless of the relative positions of Z and Z':

1-bromo-1-methyl-2-oxopropyl dimethyl phosphate,
1-chloro-1,2-diphenyl-2-oxoethyl butyl dodecyl phosphate,
2,2-dimethylpropanediol (cyclic) ester of 1-chloro-1-methyl-2-oxopropyl phosphate,
1-bromo-1-nonyl-2-oxoundecyl bis(2-chloropropyl) phosphate,
1-chloro-1-hexyl-2-oxooctyl ethyl phenylphosphonate,
1-chloro-1-propyl - 2 - oxopentyl (2-ethylhexyl) 2-ethylhexylphosphonate,
1-iodo-1-ethyl-2-oxobutyl ethyl ethylphosphonate,
1-bromo-1,2-diphenyl-2-oxoethyl 2-chloroethyl 2-chloroethylphosphonate,
1-chloro - 2 - oxo-1,2-bis(2,4-xylyl)ethyl dibenzyl phosphinate,
1-bromo - 2 - oxo - 1,2 - bis[(cyclohexyl)methyl]ethyl dipropylphosphinate, and
1-iodo-2-oxo-1,2-bis(phenylmethyl)ethyl propylethylphosphinate.

When Z and Z' are different radicals the α-halo-β-oxohydrocarbyloxy phosphorus ester products are mixtures of those having Z attached to the α-carbon having the halogen atom, and Z' being attached to the β-carbon of the hydrocarbyloxy group, and those where Z' is attached to the α-carbon and Z attached to the β-carbon. Examples of such compounds are:

1-bromo-1-phenyl-2-oxopropyl di-n-octyl phosphate,
1-bromo-1-methyl-2-phenyl-2-oxoethyl di-n-octyl phosphate, and mixtures thereof,
1-chloro-1-ethyl-2-oxohexyl bis(2-chloro-butyl) phosphate,
1-chloro-1-butyl-2-oxobutyl bis(2-chloro-butyl) phosphate, and mixtures thereof,
1-iodo-1-cyclohexyl-2-oxoethyl butyl phenyl phosphate,
1-iodo-2-cyclohexyl-2-oxoethyl butyl phenyl phosphate, and mixtures thereof,
1-bromo-1-[4-(β-naphthyl)butyl]-2-oxoundecyl n-amyl n-amylphosphonate,
1-bromo-1-nonyl-2-[4-(β-naphthyl)butyl]-2-oxoethyl n-amyl n-amylphosphonate, and mixtures thereof,
1-chloro-1-p-tolyl-2-phenyl-2-oxoethyl 4-chlorocyclohexyl 4-chlorocyclohexylphosphonate,
1-chloro-1-phenyl-2-p-tolyl-2-oxoethyl 4-chlorocyclohexyl 4-chlorocyclohexylphosphonate, and mixtures thereof,
1-iodo-1-p-methoxyphenyl-2-oxoethyl cyclopentyl phenylphosphonate,
1-iodo-2-p-methoxyphenyl-2-oxoethyl cyclopentyl phenylphosphonate, and mixtures thereof, 1-bromo-1-dodecyl-2-oxohexyl bis(3-chloro-2-bromopropyl) phosphonate,
1-bromo-1-butyl-2-oxotetradecyl bis(3-chloro-2-bromopropyl) phosphonate, and mixtures thereof,
1-chloro-1-isopropyl-2-phenyl-2-oxoethyl methylphenylphosphinate,
1-chloro-1-phenyl-3-methyl-2-oxobutyl methylphenylphosphinate, and mixtures thereof,
1-iodo-1-(p-tolyl)-3,3-dimethyl-2-oxobutyl bis(p-tolyl) phosphinate,
1-iodo-1-(t-butyl)-2-(p-tolyl)-2-oxoethyl bis(p-tolyl)phosphinate, and mixtures thereof, In carrying out the process of this invention the 1:1 phosphorus ester-dicarbonyl compound adduct is contacted with the halogen at ordinary, decreased, or elevated temperatures. Advantageously, temperatures of from −50° C. to 100° C. are used with −10° to 40° C. being preferred. Higher temperatures may be used but the indicated range of temperatures provides the best conditions for a smooth controlled reaction. Lower temperatures might also be used, but the reaction proceeds relatively slowly under these conditions.

The reaction as illustrated by the above Equation 2 is essentially a reaction between 1 mole of halogen and one mole of the adduct. Thus, the reaction is preferably carried out by charging equimolecular amounts of these substances into the reaction vessel. However, either of the reactants may be used in excess since the desired product can be isolated from an excess of either reactant.

The process may be carried out in the presence or absence of organic solvents or diluents. Examples are, e.g., hydrocarbon solvents such as benzene, toluene, xylene, hexane, etc. and alkylene halides such as methylene chloride, methylene bromide, and carbon tetrachloride. With suitable modification of apparatus and procedure the batch operation of the process described below is interchangeable with continuous procedures.

More specifically, the invention is illustrated by the following examples:

Example 1

A 42.0 g. (0.2 mole) portion of the 1:1 adduct of 2,3-butanedione and trimethyl phosphite in about 75 ml. of carbon tetrachloride was placed in a 500 ml. flask and cooled in ice as bromine was added until the mixture was no longer decolorized. About 31 g. (0.195 mole) was used. The addition was made at 5° to 10° C. in 0.3 hour. The light yellow solution was placed under water pump vacuum and the CCl₄ removed. The liquid was concentrated to 89° C./2.0 mm. to give as residue 53.3 g. (97% yield) of 1-bromo-1-methyl-2-oxopropyl dimethyl phosphate.

Example 2

A 32 g. (0.096 mole) portion of a 1:1 adduct of benzil and trimethyl phosphite was dissolved in 100 ml. of carbon tetrachloride and placed in a 500 ml. flask and cooled. Bromide was added at 3° to 5° C. until it was no longer decolorized. A total of 12.8 g. of bromine was added. The reaction mixture was concentrated to 45° C./2 mm. of pressure to give 37.9 g. of a crude residue that solidified to a yellow product on cooling to room temperature. Two crystallizations of a portion of the residue from hexane-benzene gave white crystals, M.P. 116° C.–118° C., and analyzing as follows:

|  | Calculated for $C_{16}H_{16}BrO_5P$ | Found |
| --- | --- | --- |
| Percent C | 48.2 | 48.58 |
| Percent H | 4.02 | 4.13 |
| Percent Br | 20.0 | 19.63 |
| Percent P | 7.8 | 7.80 |

Example 3

This example shows that the by-product of the halogenation is an alkyl halide.

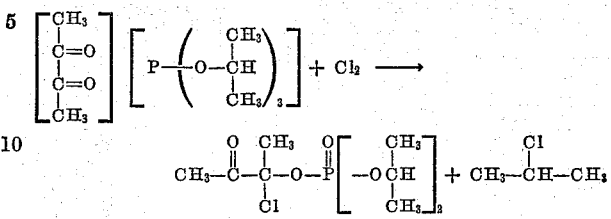

An 81.0 g. (0.275 mole) portion of a 1:1 adduct of 2,3-butanedione and triisopropyl phosphite was placed in a 500 ml. flask and cooled to −4° to −5° C. as 19.5 g. (0.275 mole) of chlorine gas was passed into the flask below the surface in 0.2 hour. The yellow reaction mixture was then concentrated to 35° C./15 mm. to give 20.0 g. of yellow liquid (1) in a Dry Ice trap and a light yellow residue (2). Fractionation of the yellow liquid (1) gave 17.7 g. (87% of theory) of isopropyl chloride, B.P. 34.5°–35.5° C.; $n_D^{25}$ 1.3763, and analyzing as follows:

|  | Calculated $C_3H_7Cl$ | Found |
| --- | --- | --- |
| Percent C | 45.8 | 45.26 |
| Percent H | 9.0 | 8.99 |
| Percent Cl | 45.2 | 44.62 |

Distillation of the light yellow residue (2) gave as the main fraction, a colorless liquid product, B.P. 84° C./0.2 mm.; $n_D^{25}$ 1.4298, and analyzing as follows:

|  | Calculated for $C_{10}H_{20}ClO_5P$ | Found |
| --- | --- | --- |
| Percent C | 41.8 | 41.62 |
| Percent H | 7.03 | 7.26 |
| Percent Cl | 12.36 | 12.33 |
| Percent P | 10.8 | 10.90 |

Example 4

Into a 500 ml. flask there was placed 88.2 g. (0.3 mole) of a 1:1 adduct of 2,3-butanedione and triisopropyl phosphite; to this there was added, with stirring and cooling, about 47 g. (0.294 mole) of bromine in 0.3 hour at 0° to 5° C. The reaction mixture was then placed under water pump vacuum and warmed to 65° C. Distillation of the reaction mixture gave 20.3 g. of isopropyl bromide, B.P. 60–61° C. The residue consisted of 101.2 g. of 1-bromo-1-methyl-2-oxopropyl diisopropyl phosphate.

Example 5

A 500 ml. flask equipped with a stirrer, thermometer, Dry Ice condenser with drying tube, and a gas inlet tube, was charged with 58.2 g. (0.209 mole) of a 1:1 adduct of 2,3-butanedione and 2-propoxy-5,5-dimethyl-1,3,2-dioxaphosphorinane. Then 14.9 g. (0.209 mole) of chlorine gas was distilled into the reaction flask. The addition was started at room temperature (25° C.) and when the temperature reached 35° C., the mixture was immersed in an ice bath and the remainder of the addition was made in 15 minutes at 25–40° C. When the addition was complete the mixture was placed under water pump vacuum and warmed to 50° C. There was thus collected in a Dry Ice trap which formed part of the apparatus, 15.7 g. of crude propyl chloride, B.P. 46–47.5° C. As residue there was obtained 56.7 g. of 2,2-dimethyl-1,3-propanediol (cyclic) ester of 1-chloro-1-methyl-2-oxopropyl phosphate of the formula

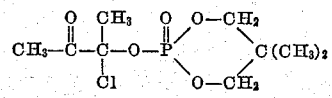

Example 6

A 500 ml. flask equipped as described in Example 5 was charged with 17.8 g. (0.0625 mole) of a 1:1 adduct of 2,3-butanedione and diethyl phenylphosphonite. Then 4.5 g. (0.0625 mole) of chlorine was allowed to distill into the reaction flask. The time of addition was 0.1 hour and the addition was made at 25–35° using an ice bath for cooling. When the reaction was complete, the mixture was placed under water pump vacuum for 15 minutes to remove the ethyl chloride by product. Distillation of the residue gave 9 g. of a pale yellow liquid, B.P. 130–134°/0.2 mm. which was 1-chloro-1-methyl-2-oxopropyl ethyl phenylphosphonate of the structure:

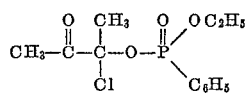

Example 7

A 500 ml. flask equipped as described in Example 5 was charged with 75.7 g. of a 1:1 adduct of 2,3-butanedione and tris(2-ethylhexyl) phosphite (0.15 mole) and methylene dichloride. Then 10.7 g. (0.15 mole) of chlorine was added to the mixture. This was started at 18° C.; the temperature increased rapidly to 30° C. so the reaction flask was immersed in an ice bath, and the remainder of the addition was made at 25 to 33° C. under these conditions. The time of addition was 10 minutes. As soon as the addition was over the mixture was subjected to water pump vacuum to remove methylene dichloride and any excess chlorine. The product was then concentrated to 114° C./0.2 mm. to obtain as residue 69.6 g. of 1-chloro-1-methyl-2-oxopropyl, bis(2-ethylhexyl) phosphate of the formula:

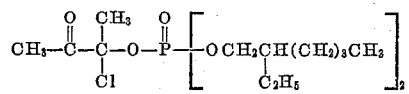

Example 8

An 80.6 g. (0.39 mole) portion of a 1:1 adduct of 2,3-butanedione and triethyl phosphite was placed in a 500 ml. flask equipped with a thermometer, stirrer, condenser with drying tube and a gas inlet tube, and then 22.6 g. (0.319 mole) of chlorine was added at 10° to 15° C., controlling the temperature by means of an ice bath. After allowing the temperature of the reaction mixture to rise to room temperature, the mixture was placed under water pump vacuum and heated to 60° C. to remove the ethyl chloride by-product. The residue was distilled to give 62.9 g. (81.2% theoretical yield) of 1-chloro-1-methyl-2-oxopropyl diethyl phosphate, B.P. 94°–95° C./0.25 mm. $n_D^{25}$ 1.4327, and analyzing as follows:

|  | Calculated for $C_8H_{16}ClO_5P$ | Found |
|---|---|---|
| Percent C | 37.19 | 37.13 |
| Percent H | 6.23 | 6.10 |
| Percent P | 11.98 | 11.82 |
| Percent Cl | 13.71 | 13.51 |

Example 9

To a 500 ml. flask equipped with a stirrer, thermometer, condenser with drying tube, and a dropping funnel was added first 105.1 g. (0.5 mole) of benzil in about 200 ml. of methylene dichloride and then 83.1 g. (0.5 mole) of redistilled triethyl phosphite. The addition was started at 12° C. and was continued within the temperature range of 10° to 20° C. for 0.67 hour. When the addition was complete, the mixture was heated to reflux to insure complete reaction. Thereafter, 39.0 g. (0.55 mole) of chlorine was added to the reaction mixture in 0.5 hour at 8–13° C. When the addition was complete, the mixture was placed under water pump vacuum to remove excess chlorine, solvent, and by-product. The residue solidified to give the substantially pure product of the formula:

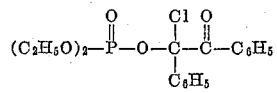

Recrystallization from pentane-benzene gave a white solid, M.P. 56–57° C., and analyzing as follows:

|  | Calculated for $C_{18}H_{20}ClO_5P$ | Found |
|---|---|---|
| Percent C | 56.55 | 56.28 |
| Percent H | 5.26 | 5.44 |
| Percent P | 8.09 | 8.42 |
| Percent Cl | 9.26 | 8.93 |

Similar treatment of the adduct of phenylglyoxal and triethyl phosphite with chlorine gives a mixture of the two possible products, i.e., diethyl 1-chloro-2-phenyl-2-oxoethyl phosphate and diethyl 1-chloro-1-phenyl-2-oxoethyl phosphate.

Example 10

A 500 ml. flask equipped with a stirrer, thermometer, Dry Ice condenser with drying tube, and a gas inlet tube was charged with 48.0 g. (0.135 mole) of a 1:1 adduct of 2,3,-butanedione and tris(2-chloroethyl) phosphite. Then 9.6 g. (0.135 mole) of chlorine was distilled into the reaction flask in 20 minutes at 30°–40° C. using ice bath cooling when necessary to control the reaction. Removal of by-product ethylene dichloride at reduced pressure gave the substantially pure bis(2-chloroethyl) 1-chloro-1-methyl-2-oxopropyl phosphate of the formula:

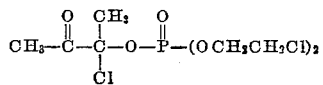

Example 11

Into a 500 ml. flask equipped as described in Example 10 was placed 24.7 g. (0.082 mole) of a 1:1 2,3-butanedione and methyl diphenylphosphinite adduct in about 40 ml. of methylene dichloride. Then 13.1 g. (0.082 mole) of bromine in about 40 ml. of methylene chloride was added dropwise in 0.15 hour at 25°–35° C., using an ice bath to cool when necessary. After the addition was complete, the reaction mixture was placed under water pump vacuum and heated to 65° C. to remove the by-product, solvent, and excess bromine. The residue was the 1-bromo-1-methyl-2-oxopropyl diphenylphosphinate.

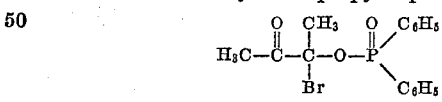

The present α-halo-β-oxohydrocarbyl phosphorus compounds are stable compounds which range from mobile liquids to crystalline solids at ordinary temperatures. They are useful for a wide variety of applications. Thus the present compounds possess pesticidal properties, e.g., as insecticides and nematocides when used in quantities of from, say 1 to 10 parts per million up to 10,000 parts per million, depending on the nature of the organism. They may also be used as fire-retardant additives to polymeric materials, e.g., urea-formaldehyde and phenol-formaldehyde type resins, the polyester type resins such as the polyterephthalates, urethane and styrene foam materials, the polyacrylonitrile and polyamido fibers, and the rubber based emulsion type paints, as well as other surface coatings such as varnishes, enamels, etc., and cellulosic materials, in quantities of from 0.5% to 10% by weight of the material to which they are added. They are also useful as leaded-gasoline additives, the quantities of such additives ranging from 0.05 to 10.0 moles of said ester per mole of lead in the gasoline. The are particularly useful as intermediates for the preparation of many new and valuable products since they contain two very active functional groups, the halogen atom and the carbonyl group.

While the above disclosure is illustrative of the methods and products of the present invention, other procedures and products within the scope of this invention will readily occur to those skilled in the arts.

We claim:
1. Compounds of the formula

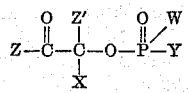

where X is selected from the group consisting of bromine, chlorine, and iodine, W and Y are selected from the group consisting of hydrocarbyl, hydrocarbyloxy, halohydrocarbyl, and halohydrocarbyloxy radicals free from aliphatic unsaturation and having from 1 to 12 carbon atoms, and where W and Y taken together stand for the —O-alkylene-O— radical having from 2 to 4 carbon atoms in the ring and a total of from 2 to 12 carbon atoms, Z is selected from the group consisting of hydrocarbyl radicals which are free of aliphatic unsaturation and have from 1 to 12 carbon atoms, and said radicals having alkoxy groups of from 1 to 2 carbon atoms as substituents therein, and Z' is selected from the group consisting of hydrocarbyl radicals which are free from aliphatic unsaturation and have from 1 to 12 carbon atoms, said radicals having alkoxy groups of from 1 to 2 carbon atoms as substituents therein, and hydrogen.

2. Dialkyl 1-chloro-2-ketohydrocarbyl phosphates wherein the said alkyl ester radicals contain from 1 to 12 carbon atoms and wherein the 1-chloro-2-ketohydrocarbyl radical is free of aliphatic unsaturation and contains from 3 to 26 carbon atoms.

3. 1-chloro-1-methyl-2-oxopropyl diisopropyl phosphate.

4. 2,2-dimethylpropanediol ester (cyclic) of 2-chloro-1-methyl-2-oxopropyl phosphate.

5. Compounds of the formula

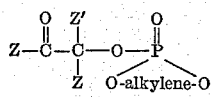

where X denotes a member selected from the group consisting of bromine, chlorine, and iodine, alkylene has from 2 to 4 carbon atoms in the ring and a total of from 2 to 12 carbon atoms, Z is selected from the group consisting of hydrocarbyl radicals which are free of aliphatic unsaturation and have from 1 to 12 carbon atoms, and said radicals having alkoxy groups of from 1 to 2 carbon atoms as substitutents therein, and Z' is selected from the group consisting of hydrocarbyl radicals which are free from aliphatic unsaturation and have from 1 to 12 carbon atoms, said radicals having alkoxy groups of from 1 to 2 carbon atoms as substituents therein, and hydrogen.

6. Compounds of the formula

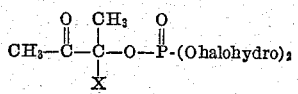

where X is selected from the group consisting of bromine, chlorine, and iodine and halohydro denotes a halohydrocarbyl radical which is free from aliphatic unsaturation having from 1 to 12 carbons.

7. The method which comprises contacting with a member selected from the group consisting of bromine, chlorine, and iodine a 1:1 adduct of the type

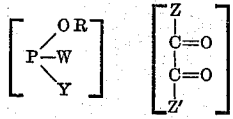

where R is selected from the group consisting of alkyl and haloalkyl radicals which have from 1 to 12 carbon atoms, W and Y are selected from the group consisting of hydrocarbyl, hydrocarbyloxy, halohydrocarbyl, and halohydrocarbyloxy radicals which are free from aliphatic unsaturation and have from 1 to 12 carbon atoms, and wherein W and Y taken together stand for the bivalent —O-alkylene-O— radical of from 2 to 4 carbon atoms in the ring and a total of from 2 to 12 carbons, Z is selected from the group consisting of hydrocarbyl radicals which are free of aliphatic unsaturation and have from 1 to 12 carbon atoms, and said radicals having alkoxy groups of from 1 to 2 carbon atoms as substituents therein, and Z' is selected from the group consisting of hydrocarbyl radicals which are free from aliphatic unsaturation and have from 1 to 12 carbon atoms, said radicals having alkoxy groups of from 1 to 2 carbon atoms as substituents therein, and hydrogen, and recovering from the resulting reaction a compound of the formula

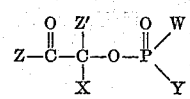

where X, W, Y, Z and Z' are as above defined.

8. The method which comprises contacting with a member selected from the group consisting of bromine, chlorine and iodine, a 1:1 adduct of a trialkyl phosphite containing 1 to 12 carbon atoms in each alkyl radical and an α-dicarbonylic compound of the type

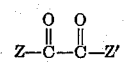

where Z is selected from the group consisting of hydrocarbyl radicals which are free of aliphatic unsaturation and have from 1 to 12 carbon atoms, said radicals having alkoxy groups of from 1 to 2 carbon atoms as substituents therein, and Z' is selected from the group consisting of hydrocarbyl radicals which are free from aliphatic unsaturation and have from 1 to 12 carbon atoms, said radicals having alkoxy groups of from 1 to 2 carbon atoms as substituents therein, and hydrogen, and recovering from the resulting reaction mixture a compound of the formula

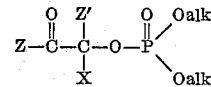

where alk denotes an alkyl radical containing 1 to 12 carbon atoms, and X, Z, and Z' are as defined above.

9. The process which comprises contacting with a member selected from the group consisting of bromine, chlorine and iodine a 1:1 adduct of the type

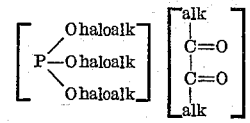

where alk denotes an alkyl radical of from 1 to 12 carbon atoms and haloalk denotes a haloalkyl radical which contains 1 to 12 carbon atoms and recovering from the resulting reaction a compund of the formula

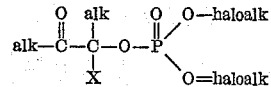

where X, alk, and haloalk are as defined above.

10. The method which comprises contacting with a member selected from the group consisting of bromine, chlorine and iodine a 1:1 adduct of the type

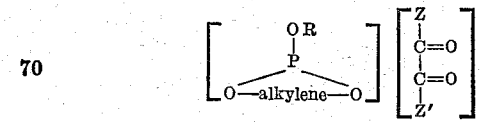

where R is selected from the group consisting of hydrocarbyl and halohydrocarbyl radicals which are free of aliphatic unsaturation and contain from 1 to 12 carbon atoms, alkylene denotes an alkylene radical having from 2 to 4 carbon atoms in the ring and a total of from 2 to 12 carbon atoms, Z is selected from the group consisting of hydrocarbyl radicals which are free of aliphatic unsaturation and have from 1 to 12 carbon atoms, and said radicals having alkoxy groups of from 1 to 2 carbon atoms as substituents therein, and Z' is selected from the group consisting of hydrocarbyl radicals which are free from aliphatic unsaturation and have from 1 to 12 carbon atoms, said radicals having alkoxy groups of from 1 to 2 carbon atoms as substituents therein, and hydrogen, and recovering from the resulting reaction a compound of the formula

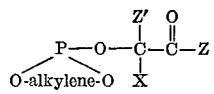

where X, alkylene, Z and Z' are defined above.

11. The method as defined in claim 7 in which W and Y are both methoxy groups, Z and Z' are methyl groups, and X is chlorine.

12. The method as defined in claim 8 in which Z and Z' are both phenyl groups, W and Y are ethoxy groups, and X is bromine.

13. The method as defined in claim 8 in which W and Y are both isopropoxy groups, and X is chlorine.

14. The method according to claim 7 in which R is an ethyl radical, W is an ethoxy radical, and Y is a phenyl radical and X is chlorine.

15. The method according to claim 9 in which haloalk is 2-chloroethyl, alk is methyl, and X is chlorine.

16. The method according to claim 7 in which R is a methyl group, W and Y are both phenyl groups, and X is bromine.

17. Compounds of the formula

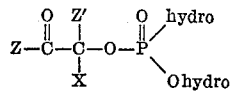

wherein X is selected from the group consisting of bromine, chlorine, and iodine, hydro denotes a hydrocarbyl radical which is free from aliphatic unsaturation and has from 1 to 12 carbon atoms, Z is selected from the group consisting of hydrocarbyl radicals which are free from aliphatic unsaturation and have from 1 to 12 carbon atoms, and said radicals having alkoxy groups of from 1 to 2 carbon atoms as substituents therein, and Z' is selected from the group consisting of hydrocarbyl radicals which are free from aliphatic unsaturation and have 1 to 12 carbon atoms, said radicals having alkoxy groups of from 1 to 2 carbon atoms as substituents therein, and hydrogen.

18. Compounds of the formula

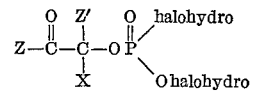

wherein X is selected from the group consisting of bromine, chlorine, and iodine, halohydro denotes a halogen-substituted hydrocarbyl radical which is free of aliphatic unsaturation and has from 1 to 12 carbon atoms, Z is selected from the group consisting of hydrocarbyl radicals which are free from aliphatic unsaturation and has from 1 to 12 carbon atoms, and said radicals having alkoxy groups of from 1 to 2 carbon atoms as substituents therein, and Z' is selected from the group consisting of hydrocarbyl radicals which are free from aliphatic unsaturation and have from 1 to 12 carbon atoms, said radicals having alkoxy groups of from 1 to 2 carbon atoms as substituents therein, and hydrogen.

References Cited in the file of this patent

Arbuzov et al.: Proc. Acid Sci. USSR (English Translation) 106, 35–8 (1956).

UNITED STATES PATENT OFFICE
CERTIFICATE OF CORRECTION

Patent No. 3,031,489                     April 24, 1962

Gail H. Birum et al.

It is hereby certified that error appears in the above numbered patent requiring correction and that the said Letters Patent should read as corrected below.

Column 5, line 12, for "thereof," read -- thereof. --; column 8, line 26, for "2,3,-butanedione" read -- 2,3-butanedione --; column 9, line 37, for "2-chloro-" read -- 1-chloro- --; lines 40 to 43, the formula should appear as shown below instead of as in the patent:

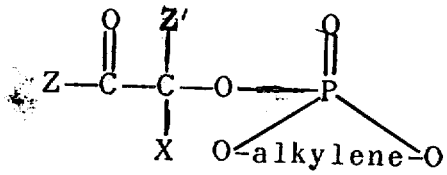

column 10, lines 59 to 62, the formula should appear as shown below instead of as in the patent:

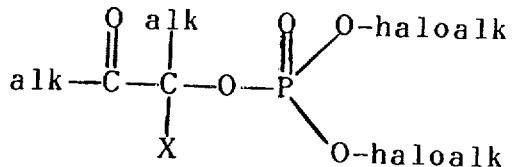

Signed and sealed this 4th day of September 1962.

(SEAL)
Attest:
ERNEST W. SWIDER
Attesting Officer

DAVID L. LADD
Commissioner of Patents